United States Patent
Vorwaller et al.

(10) Patent No.: US 12,151,186 B2
(45) Date of Patent: Nov. 26, 2024

(54) CLARIFIER WITH IMPROVED ENERGY DISSIPATING INLET

(71) Applicant: Ovivo Inc., Montreal (CA)

(72) Inventors: John Vorwaller, Salt Lake City, UT (US); Tyson Beaman, Murray, UT (US)

(73) Assignee: Ovivo Inc., Montreal (CA)

( * ) Notice: Subject to any disclaimer, the term of this patent is extended or adjusted under 35 U.S.C. 154(b) by 810 days.

(21) Appl. No.: 17/010,466

(22) Filed: Sep. 2, 2020

(65) Prior Publication Data

US 2020/0398193 A1 Dec. 24, 2020

Related U.S. Application Data

(63) Continuation-in-part of application No. 16/537,379, filed on Aug. 9, 2019, now Pat. No. 10,781,125.

(60) Provisional application No. 62/718,313, filed on Aug. 13, 2018.

(51) Int. Cl.
*B01D 21/24* (2006.01)
*B01D 21/00* (2006.01)

(52) U.S. Cl.
CPC ..... *B01D 21/2405* (2013.01); *B01D 21/0042* (2013.01); *B01D 21/2427* (2013.01)

(58) Field of Classification Search
CPC .... B01D 21/24; B01D 21/00; B01D 21/2405; B01D 21/0042; B01D 21/2427
See application file for complete search history.

(56) References Cited

U.S. PATENT DOCUMENTS

| | | | | |
|---|---|---|---|---|
| 4,273,658 | A * | 6/1981 | Karman | B01D 21/2427 210/709 |
| 5,944,995 | A * | 8/1999 | Sethi | B01D 21/2411 210/519 |
| 6,276,537 | B1 | 8/2001 | Esler et al. | |
| 6,736,275 | B2 * | 5/2004 | Schneider | B01D 21/245 210/519 |
| 7,243,802 | B2 | 7/2007 | Albertson | |
| 7,378,027 | B2 | 5/2008 | Zhou | |

(Continued)

OTHER PUBLICATIONS

Hydrosims, "Multilayer Energy Dissipating Inlet Column in Center-Feed Clarifiers", print from hydrosims.com website, 14 pages, Hydrosims, copyright 2005-2008.

(Continued)

*Primary Examiner* — Youngsul Jeong
(74) *Attorney, Agent, or Firm* — Thomas M. Freiburger

(57) ABSTRACT

A clarifier of a wastewater treatment system is made more efficient and cost effective with an energy dissipating inlet (EDI) that removes the need for a conventional feedwell/EDI system. A central influent pipe has wastewater outlet ports under the liquid surface, the ports being surrounded by an efficient EDI surrounding the center pipe and extending outwardly therefrom. The EDI receives influent flow and directs the sludge outwardly and generally downwardly at reduced flow velocity. Series of baffles in the EDI help slow the flow velocity and disperse the sludge. In another embodiment a faucet-type EDI has discharge openings that disperse the sludge downwardly after it has flowed through sets of baffles above. Significant cost reductions in material and installation are realized by elimination of the conventional feedwell/EDI system.

18 Claims, 8 Drawing Sheets

(56) References Cited

U.S. PATENT DOCUMENTS

2003/0136730 A1    7/2003  Schneider et al.
2004/0020847 A1*   2/2004  Wright .............. B01D 21/2411
                                                          210/519
2008/0135473 A1*   6/2008  Pophali .............. B01D 21/245
                                                          210/525

OTHER PUBLICATIONS

Evoqua Water Technologies, "Envirex FEDWA Baffle System—A Step Up in Circular Clarfier Capacity & Efficiency", print from evoqua.com website, 2 pages, Evoqua Water Technologies, LLC 2020.

CPE Services, Inc., "The New DUO-FLOC LA-EDI", print from clarifiers.com website, 2 pages, Clarifier Performance Evaluations, Inc., 2020.

Fitzpatrick, Jim et al., "Optimizing Clarifier Performance—Are We Designing the Clarifiers Right?", print from newea.org website, 33 pages, NEWEA, Jan. 27, 2016.

\* cited by examiner

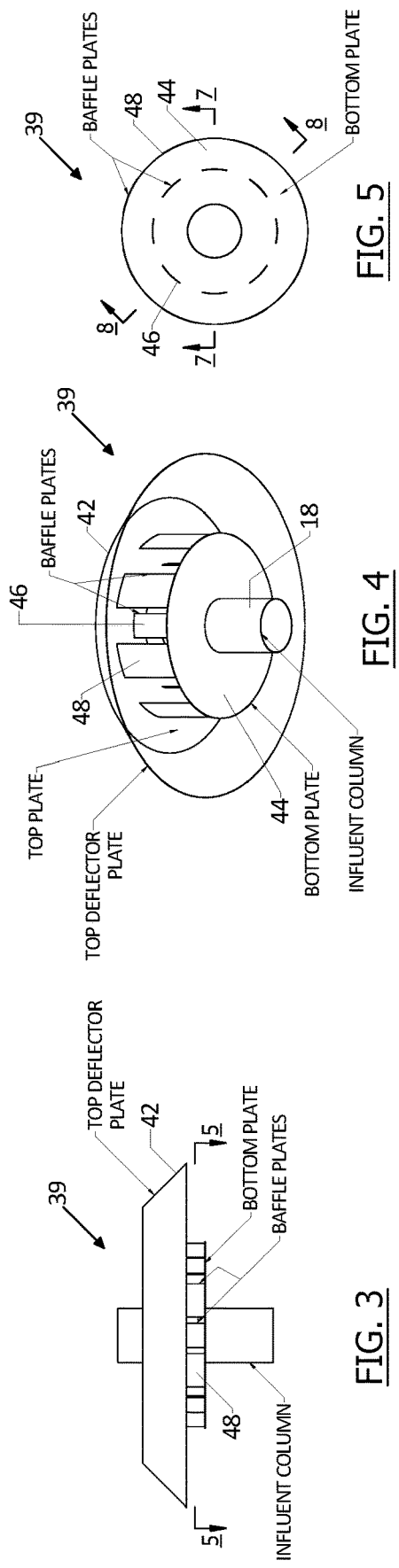

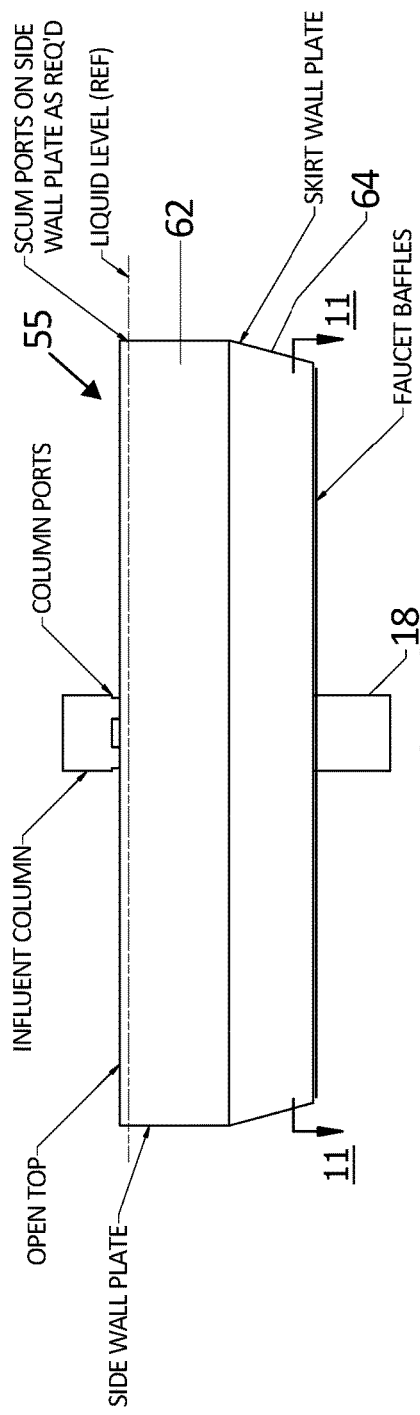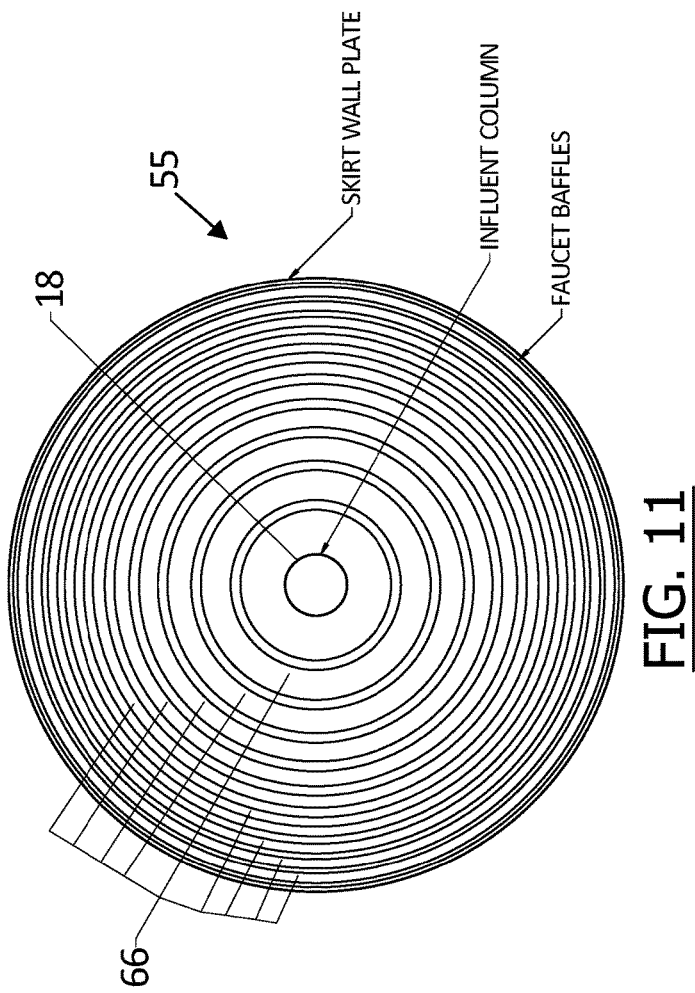

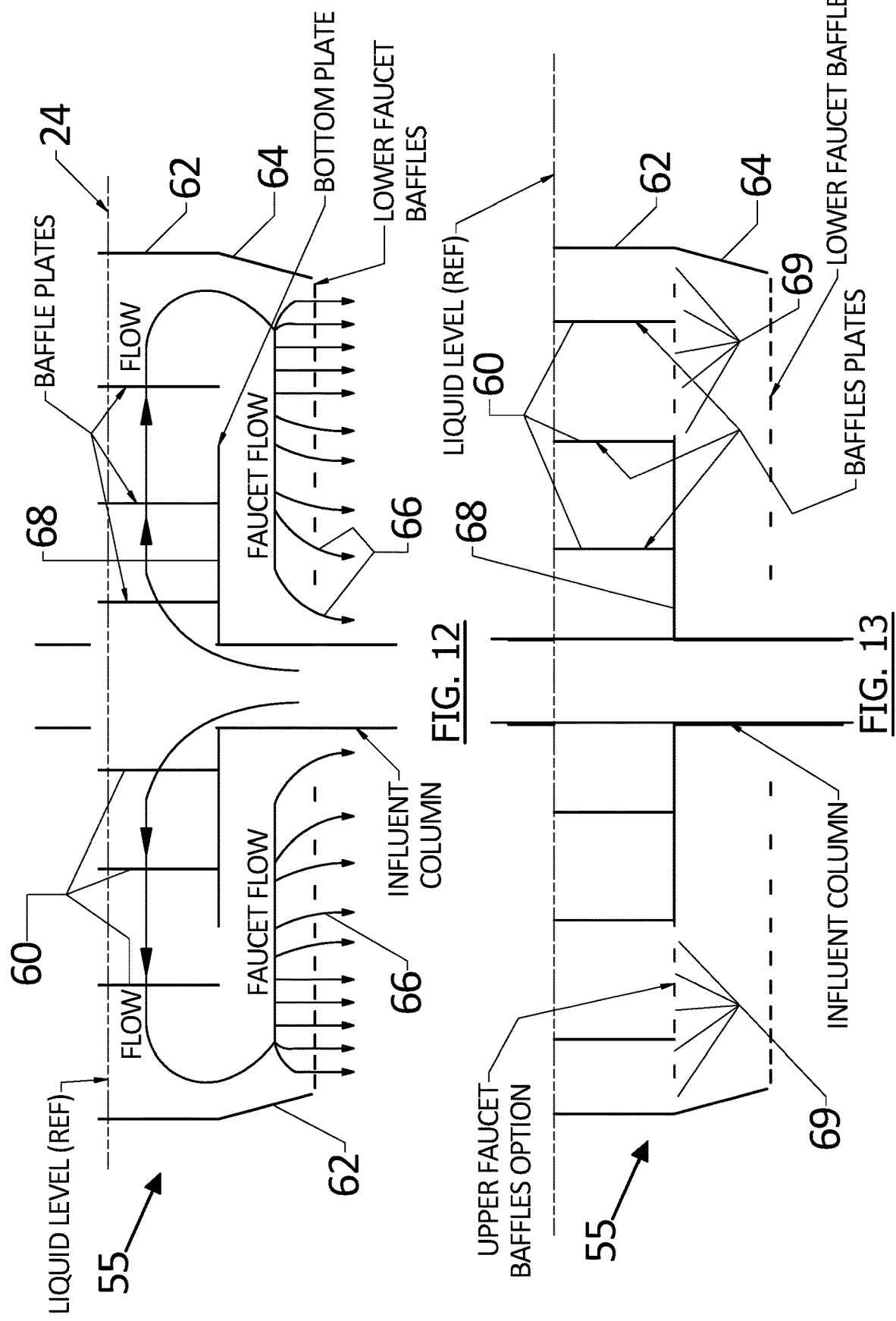

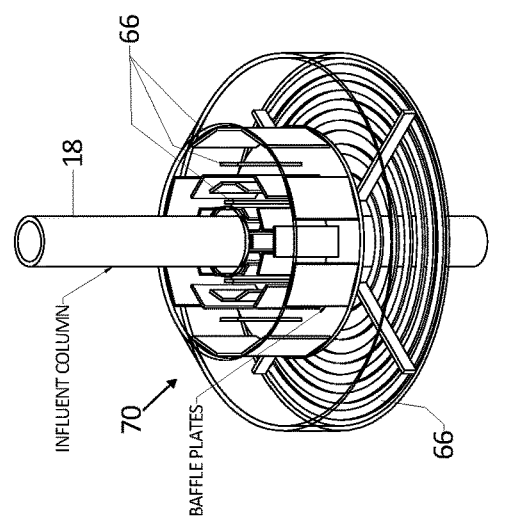
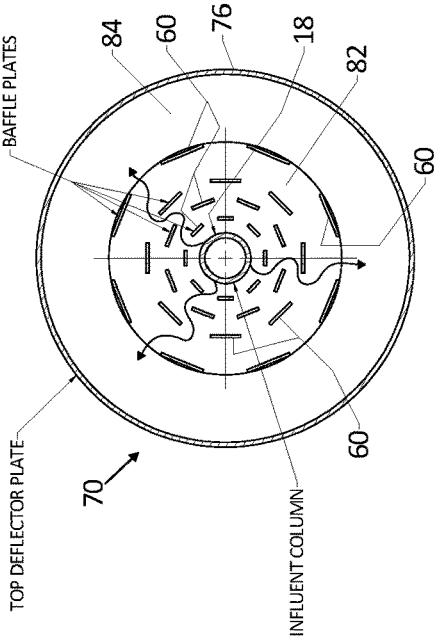
FIG. 17
FIG. 18
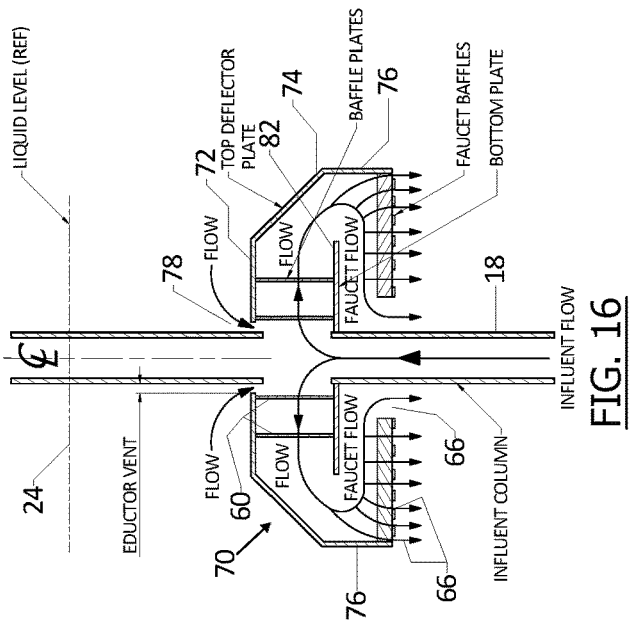
FIG. 16
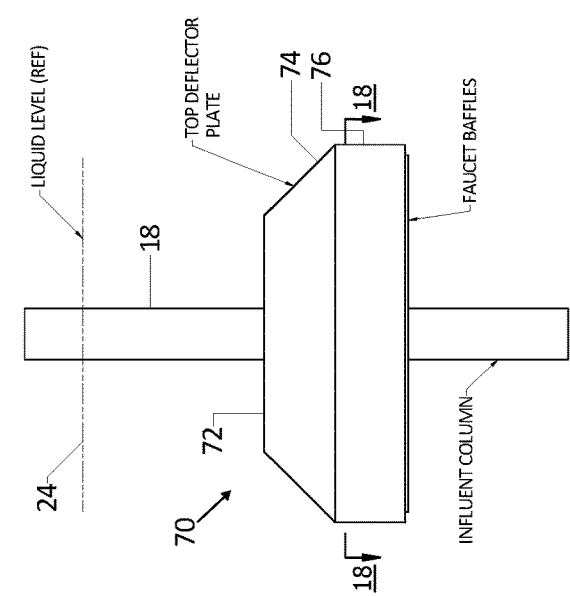
FIG. 15

CLARIFIER WITH IMPROVED ENERGY DISSIPATING INLET

This application is a continuation-in-part of application Ser. No. 16/537,379, filed Aug. 9, 2019, now U.S. Pat. No. 10,781,125, which claimed benefit of provisional application No. 62/718,313, filed Aug. 13, 2018.

BACKGROUND OF THE INVENTION

This invention concerns a clarifier or sedimentation basin in a wastewater treatment system, and in particular is directed to an improved energy dissipating inlet (EDI) that eliminates the need for a feedwell in the clarifier.

The typical flow for a standard column-supported clarifier enters the center pier/influent column at the tank floor, flows vertically up the column to column ports located at the water surface elevation, exits the column ports at a velocity of 2-4 ft/sec at maximum flowrates, enters an energy dissipating inlet and exits its ports at 1-2 ft/sec at maximum flowrates. Instead of a center influent column, the flow can be fed from the top or the side to enter into the energy dissipating outlet. After exiting the EDI ports the sludge then enters into the annular space created by the feedwell and EDI vertical walls, to promote flocculation and to reduce the downward velocity to a preferred approximate range of 4-8 ft/min at maximum flowrates exiting the feedwell, although the velocity range is sometimes much higher. The flow then is directed outward and travels horizontally toward the tank wall at approximately 4-8 fpm at maximum flowrates (sometimes higher), allowing the solids to settle to the floor and the water to rise to the effluent launders of the clarifier.

A problem of this conventional construction is cost, especially cost of material in the feedwell. In addition, often the annular space between the EDI and feedwell vertical walls collects scum. Even with feedwell scum ports and a scum spray system in the annular space it is difficult to push the scum out into the clarification zone to be collected and removed by the clarifier's scum skimming system.

The majority of a clarifier's cost are fabricated components and the majority of the fabricated components weight is associated with the feedwell and energy dissipating inlet and their associated supports. The solution provided by several embodiments of the invention is to significantly reduce the cost of fabricated material while maintaining and/or enhancing the process and effluent quality of the clarifier. In addition, submerged EDIs of the invention are effective in a clarifier which is also an equalizaion basin, with varying liquid level, which is generally not possible with conventional EDI/feedwell designs because they can never be fully submerged.

SUMMARY OF THE INVENTION

In the current invention a clarifier of a wastewater treatment system is made more efficient and cost effective. The influent feedwell and conventional energy dissipating inlet (EDI) are replaced. A central column, top or side feed, has wastewater delivery openings well under the liquid surface, preferably between one-quarter to three-quarters of the depth of the liquid in the tank. The ports or openings are surrounded by what can be called a reverse energy dissipating inlet (sometimes called REDI) attached to the center cage and extending radially outwardly therefrom. The reverse EDI includes a series of baffles. For clarifiers with higher flowrate requirements or require additional energy dissipation to provide lower outlet velocities and more equalized exit flow distribution, an additional layer of baffling can be provided concentric to the energy dissipating inlet. This addition to the submerged reverse EDI can be called a faucet energy dissipating inlet. For even higher flowrates and more stringent requirements the special EDI can be increased in size and located at the liquid surface. This non-submerged design has two embodiments. The first has faucet baffles only at the lower layer and the second has faucet baffling at both upper and lower layers.

In a principal embodiment, just above the influent ports/openings a top plate of the reverse EDI extends outwardly and downwardly as a deflector for entering sludge. Thus, sludge enters the tank through the ports/openings and is directed outwardly and generally downwardly. Importantly, flow velocity is reduced from about 1 to 2 feet per second at maximum flowrates exiting the influent ports/openings, to a typical range of about 4 to 8 feet per minute by the reverse EDI, to promote settling of solids to the floor of the tank. An educt gap is positioned between the EDI's top plate and the center influent pipe. Series of baffles are positioned between the top and bottom plates in the reverse EDI, helping slow the flow velocity to the desired velocity, typically 4 to 8 fpm, although this range can be higher. The design of the reverse EDI is such as to cause eductor flow from the tank volume down along the center influent to mix with the flow at the ports, which is important to establish desired circulation within the tank.

Significant cost reductions in material and installation are realized, as compared to a conventional EDI and feedwell system. The system of the invention reduces fabricated material weight by 10% to 20% or more, or the total clarifier cost by about 5% to 10%. The reverse EDI is designed to produce similar horizontal velocities to the existing industry standard EDI/feedwell configuration.

The standard flow for a clarifier with an EDI of the invention is the following: Flow enters from the tank floor, side or top, travels through the influent structure of the clarifier and exits the influent ports/openings located at between about 25% to 75% side water depth, enters the EDI and flows horizontally through a series of baffle layers to reduce the exit velocity at least to industry standard horizontal velocities that would be produced by a standard EDI and feedwell configuration located at the water surface elevation.

Importantly, eliminating the feedwell eliminates the annular space between the EDI and feedwell vertical walls, a space that collects scum.

It is among the objects of the invention to improve the performance efficiency in a clarifier, while greatly simplifying the clarifier system, eliminating the need for a feedwell. These and other objects, advantages and features of the invention will be apparent from the following description of a preferred embodiment, considered along with the accompanying drawings.

DESCRIPTION OF THE DRAWINGS

FIG. 3 is a side elevation view showing an improved energy dissipating inlet (EDI) according to the invention, positioned around a center column of a clarifier.

FIG. 4 is a perspective bottom view of the EDI.

FIG. 5 is a schematic sectional plan view indicating a center column and the EDI of the invention.

FIG. 6 is a top perspective view of the EDI.

FIG. 7 is a schematic sectional elevation view indicating a center column, the EDI with a set of baffles, and flow patterns, as seen along the plane 7-7 in FIG. 5.

FIG. 8 a view similar to FIG. 7, showing the location of another set of baffle plates of the EDI, as seen along the plane 8-8 in FIG. 5.

FIG. 10 is an elevation view showing the EDI of FIG. 9.

FIG. 11 is a bottom plan view of the EDI of FIG. 9.

FIGS. 12 and 13 are schematic elevation views in section, showing the EDI of FIG. 9 with sets of baffles and indicating faucet flow out of the EDI, and with FIG. 13 showing a variation.

FIGS. 15-18 are elevation, section, cut-away perspective, and plan section views showing smaller embodiment of a submerged faucet type EDI.

DESCRIPTION OF PREFERRED EMBODIMENTS

Figure 1:
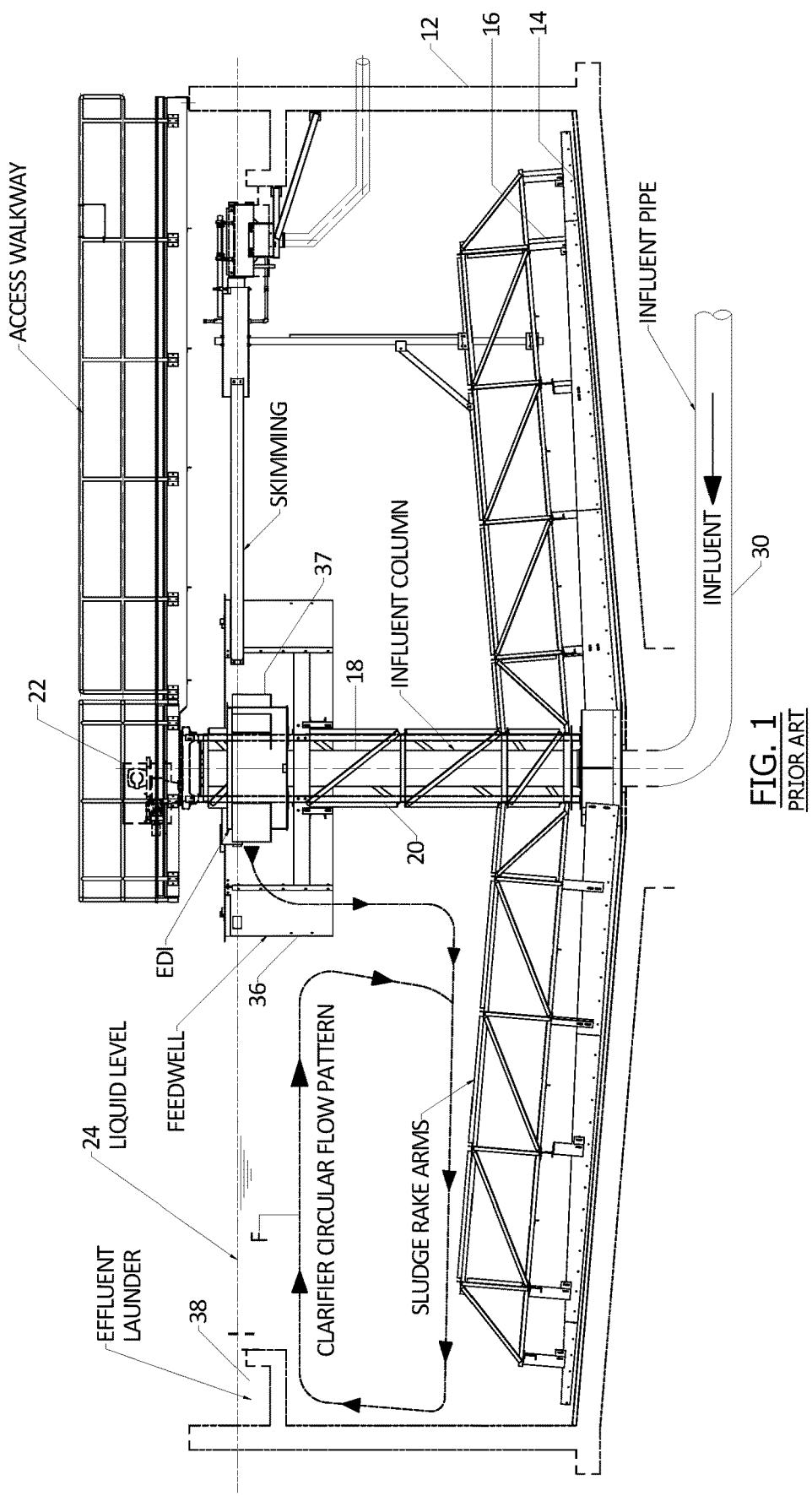
FIG. 1 is an elevation view showing somewhat schematically a prior art column supported center feed clarifier in which the system of the invention can be applied.

FIG. 1 shows a column supported center feed clarifier 10 in a conventional system, indicating prior art. The illustrated clarifier comprises a basin 12, typically concrete or steel, with a basin floor 14, sludge rake arms 16 and a central influent column 18. A rotating central cage is shown at 20, around the central column 18, at the top of which is equipment 22 that drives the rake arms via the cage 20. The liquid surface in the clarifier is indicated at 24.

Wastewater influent enters the clarifier via a pipe 30 beneath the floor, delivering the flow up through the central column 18, to be delivered into the clarifier through exit ports near an upper end of the column 18.

As in conventional clarifier design, the illustrated clarifier has a feedwell or stilling well 36, a vertically oriented annular band that extends slightly above the liquid surface 24 and down into the clarifier. As an example, in a conventional clarifier the feedwell or stilling well might have a diameter of between 20% to 50% of the tank diameter and a height between 30% to 70% of the side water depth.

Clarifiers of the prior art have also typically included an energy dissipating inlet 37 surrounding the outlet ports of the center column 18. The energy dissipating inlet or EDI is of much smaller diameter than the feedwell, and with some form of vanes/baffles or other device that slows the velocity of the sludge as it moves outwardly through the annular space between the EDI 37 and the feedwell 36 in the clarifier. The objective of the EDI 37 and the feedwell 36 is to reduce velocity of the incoming sludge to a desired range, which may be about 4 to 8 feet per minute as noted above. Flow arrows and pattern F generally indicate a circular flow pattern in the clarifier that is produced between the feedwell 36 and the clarifier's outer wall, and sludge settles to the bottom and clarified liquid exits into a peripheral effluent launder 38.

Figure 2:
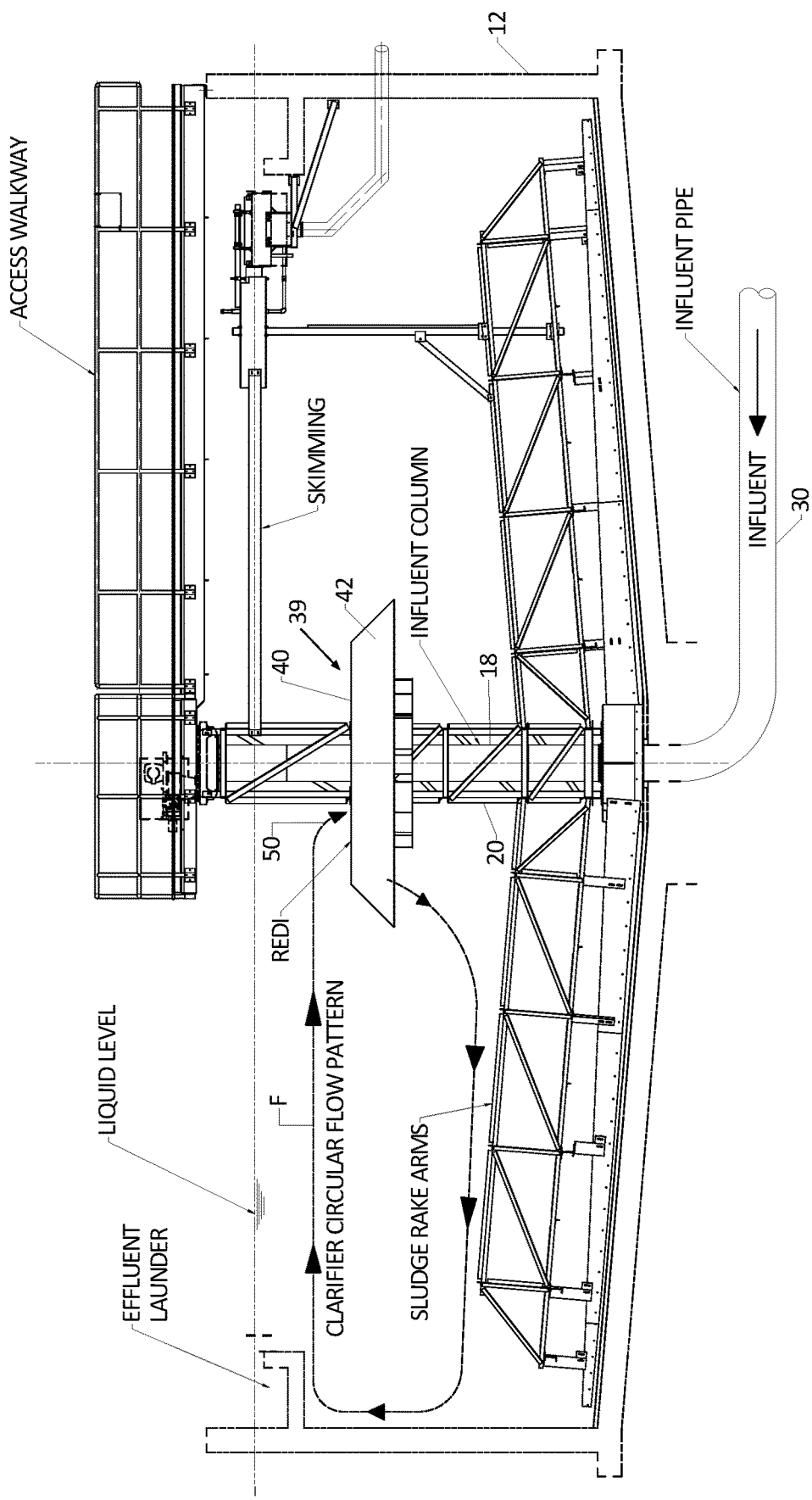
FIG. 2 is a similar sectional elevation view but showing apparatus of the invention.

The invention achieves the low-velocity flow target without a feedwell. FIG. 2 shows the invention in a clarifier similar to that of FIG. 1, producing a flow pattern F generally similar to that of the EDI/stilling well equipment in FIG. 1. An improved energy dissipating inlet (EDI) or "reverse" EDI 39 according to the invention is shown in FIG. 2 and also FIGS. 3 through 8 ("reverse" reflecting that it could be considered upside-down as compared to a conventional EDI).

The EDI 39 includes a top plate 40 that has at its periphery a conical top deflector plate 42. The preferred shape of the plate 42 is best seen in FIGS. 2, 3, 4 and 6, as well as the schematic sections of FIGS. 7 and 8. The center influent column 18 is seen in some of the drawings, passing through the reverse EDI 39 with a small clearance 43 at the top plate 40, as best seen in FIGS. 6, 7 and 8. This clearance is sized to promote educt flow as indicated in FIG. 7, back down into the EDI along the outside of the center column. A bottom plate 44 of the EDI is spaced down from the top plate and fits tightly on the influent column so that the EDI 39 can be connected to the rotating center cage 20.

Between the top and bottom plates 40 and 44 are one or more series of baffle plates 46, 48. In the embodiment shown an inner series of baffles 46 is closer to the central influent, and an outer series of baffles 48 has baffles at the edges of the bottom plate and staggered in position relative to the inner baffles 46. The flow of wastewater first flows out the center influent openings or ports, which may be at 1 to 3 feet per second at maximum flow, then through the series of baffles and outwardly toward the top deflector plate 42, as shown in FIG. 7. The baffles prevent direct flow from the ports out into the clarifier, so that flow is slowed as the sludge spreads outwardly from the center influent. The top deflector plate 42 causes the flow to turn downwardly somewhat. As the flow exits the EDI 39 into the clarifier volume, it has reached a desired lower velocity, which may be about 4 to 8 feet per minute at maximum flowrates.

FIGS. 7 and 8, as well as FIG. 6, show the clearance or a gap 43 between the inner annulus of the top plate 40 and the center influent 18. This forms an eductor vent in the space around the influent, allowing eductor flow 50 to enter the EDI as shown in FIG. 7. The EDI 39 is set deep into the clarifier liquid, e.g. between 25% to 75% the liquid depth, and this eductor flow, indicated by arrows 50 in FIGS. 2 and 3, is important to facilitate proper circulation within the clarifier, with a flow pattern F similar to traditional clarifier flow patterns. The eductor flow joins the influent flow exiting the influent ports.

It was observed that a traditional feedwell creates a downward and horizontal velocity of about 4 fpm at maximum flowrates exiting the feedwell. To create approximately the same effect, the reverse EDI 39 of the invention preferably is submerged so that its top plate is approximately at the same depth as the bottom of a feedwell. The reverse EDI's configuration, including the baffles, reduces flow velocities much more than a traditional EDI.

With the improved EDI constructed as described above and submerged into the tank as described, flow patterns in the clarifier were generally similar to those of a traditional EDI and feedwell system, although with improved reduction and distribution of velocity. The eductor at top of the new EDI uses the influent port exit velocity to draw the flow above the plate inwardly into the EDI, which helps to create a traditional flow pattern.

Figure 9:
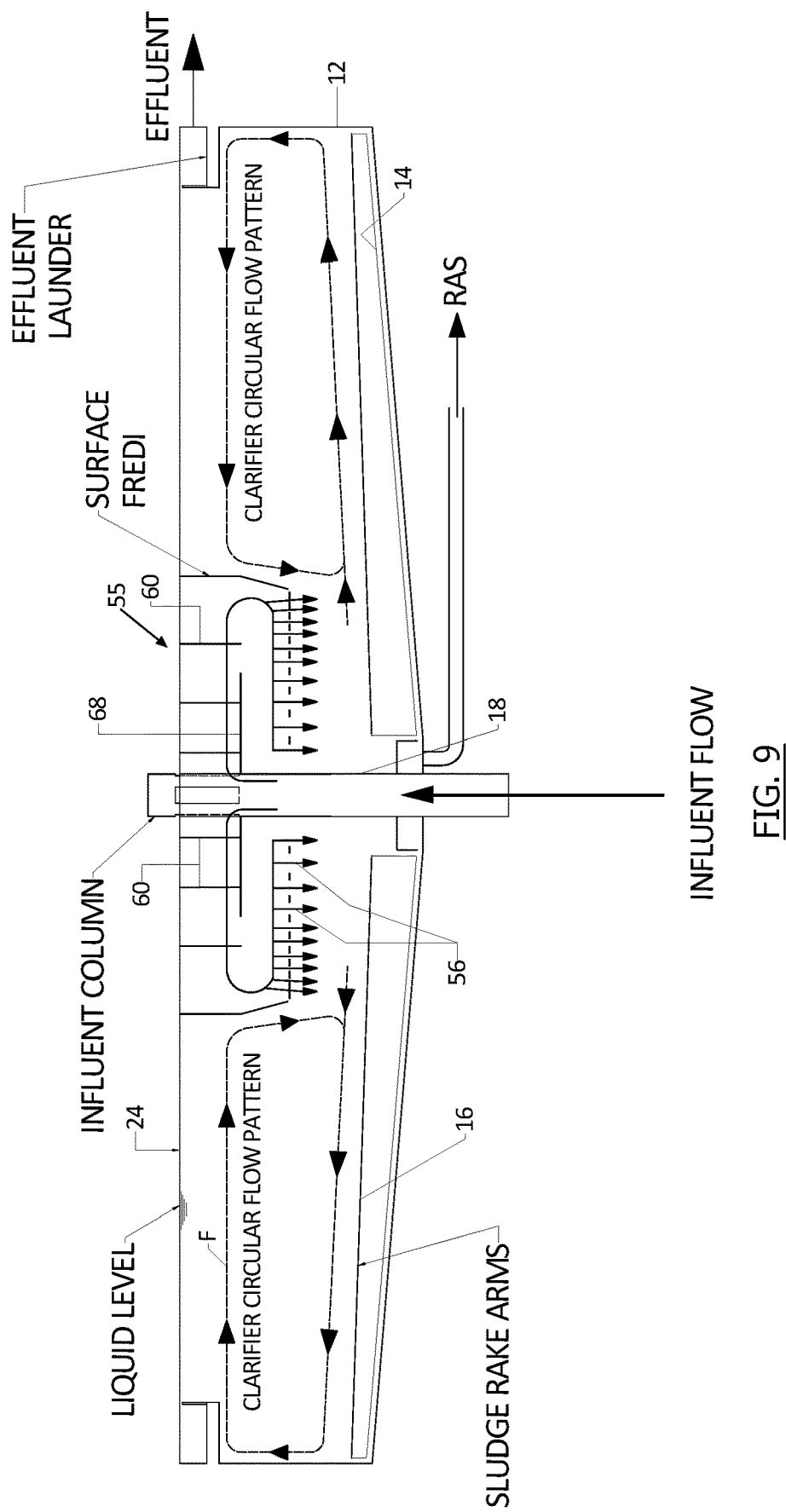
FIG. 9 is a sectional elevation view showing a clarifier with a second form of EDI according to the invention.

FIG. 9 is a view similar to FIG. 2, but showing a different form of EDI 55, which can be called a faucet EDI in that the wastewater, after passing through baffles, is directed essentially vertically downwardly in the clarifier 12 as indicated by arrows 56. This EDI 55 can be somewhat larger diameter than the EDI 39 shown in FIG. 2, and is preferably placed with its open upper end at the surface 24 of liquid in the clarifier. In this schematic drawing the clarifier circular flow pattern F is again shown, similar to that of FIGS. 1 and 2, except that the EDI 55 of this embodiment does not induce eductor flow as a return current down along the exterior of the center column 18. The EDI 55 has a large series of internal baffles around which the sludge exiting the center column flows, as indicated generally at 60 in FIG. 9 and shown more particularly in the drawings that follow. A plate or floor 68 divides upper and lower parts of the EDI.

FIGS. 10 and 11 show side and bottom views of the EDI 55. The outer wall or side wall 62 of the EDI 55 may be partially cylindrical but inwardly tapered at a lower skirt wall plate 64, for a purpose apparent from FIGS. 12 and 13 discussed below. At the bottom of the EDI are a series of openings, shown as an array of concentric annular openings, for ejecting the wastewater downwardly, the drawing indicating that approximately ten of these annular openings 66 can be provided. Other arrangements and patterns of openings can be used, in any desired number.

Figure 14:
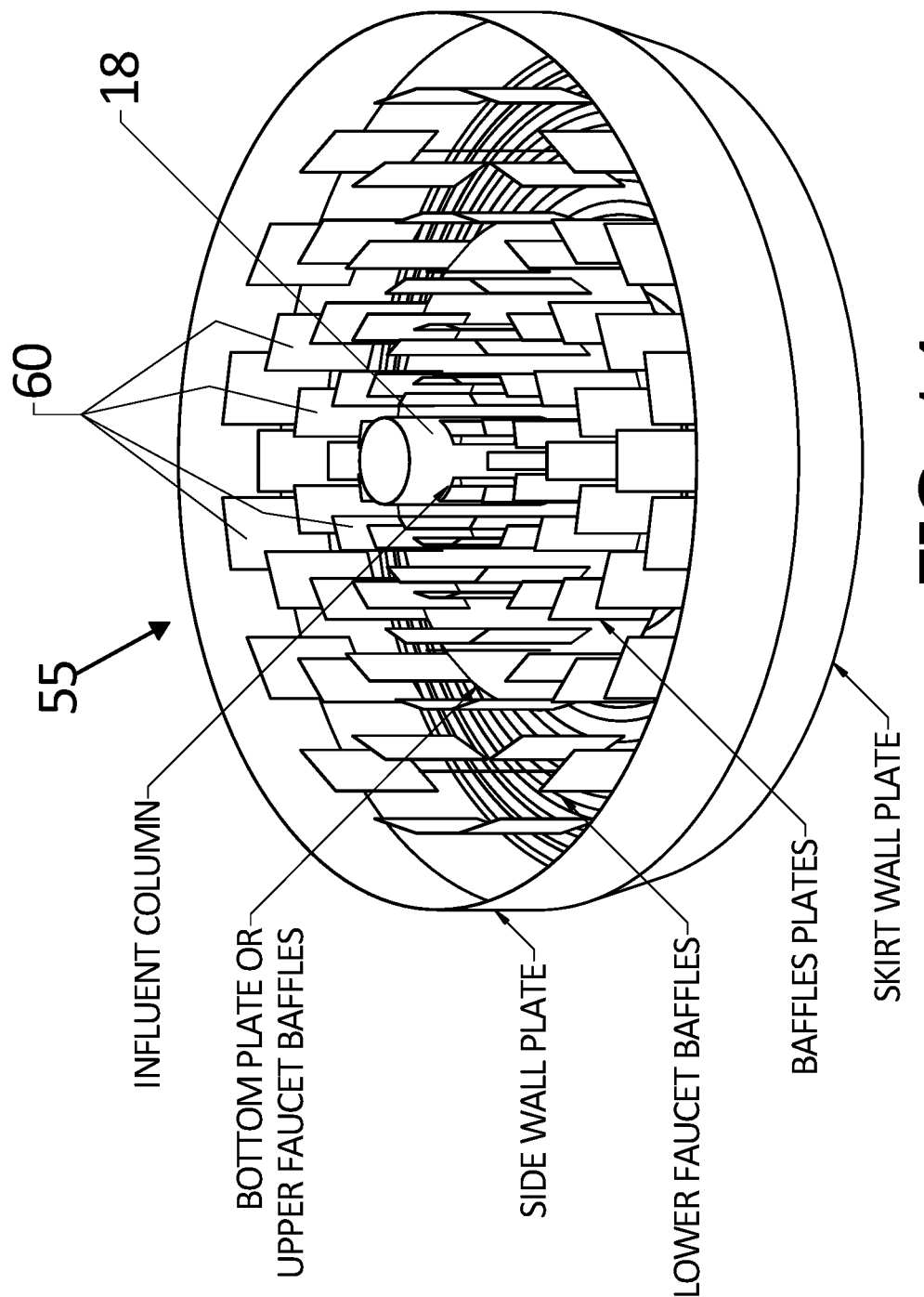
FIG. 14 is a top perspective view of the EDI.

As shown in the schematic view of FIG. 12, and also referring to FIG. 9, the wastewater is directed radially outwardly from the center influent column 18 and is directed through the series of baffles 60 which are above the annular openings 66 and separated therefrom by a divider floor 68 as indicated schematically in FIG. 9. As seen in FIGS. 13 and 14, these baffles in this embodiment are staggered from one annular array to the next so that flow is distributed, dispersed and slowed. The wastewater then flows down and then back radially inwardly, as can be seen in FIG. 9 and also FIG. 12, and as the wastewater flows inwardly it encounters the annular openings 66. The radially outermost annular discharge openings 66 are farthest upstream, while the innermost annular opening is far downstream, adjacent to the influent column. Thus, the outermost annular opening 66 is smallest, and the openings become progressively larger toward the innermost opening. Because the flowing liquid takes the path of least resistance, the progressively larger openings along the path will essentially balance flow distributed out through the openings 66. Note that the openings 66 could be of any desired shape and number, not necessarily annular openings as shown.

The schematic elevation sectional view of FIG. 12 shows the EDI 55 as seen through some of the baffles 60, while the schematic section of FIG. 13 can be seen as illustrating the other set of baffles, although FIG. 13 also shows a variation. As shown in FIG. 14, a series of annular arrays of baffles can be included (six being illustrated here), with staggering, such that the sectional view of FIG. 12 essentially shows only half the baffle plates 60. In FIGS. 12 and 13 it is seen that the EDI 55 is preferably open at top, without any top plate. Thus, the baffles 60 extend slightly above the liquid surface 24. Note that the extensive baffling creates flow resistance, which helps produce an even and consistent flow down through the annular openings 66. Eductor flow such as in the embodiment of FIGS. 2 through 8 would not be effective with this EDI, since high flow resistance could create back pressure preventing eductor flow.

As noted above, FIG. 13 is a cross section view similar to FIG. 12 but looking through remaining baffles 60 which are staggered in position relative to those shown in FIG. 12. FIG. 13 also shows a variation in which upper faucet openings 69 are provided in the floor 68 at radially outward positions. This helps further slow flow and creates a somewhat different flow pattern. The faucet openings 69 can be of increasing size progressing downstream, as with the faucet openings 66 below.

The faucet EDI 55 of FIGS. 9 through 14 produces a greatly slowed, evenly distributed flow directed downwardly in the clarifier so as to assist in achieving a desired circular flow pattern F in the clarifier.

Another embodiment of an EDI according to the invention is shown in FIGS. 15 through 18. FIG. 15 shows the EDI 70 positioned concentrically around a center influent column 18. As shown, the EDI 70 is submerged in the liquid, essentially as in the EDI 39 of FIG. 2, the liquid level 24 being shown above.

Referring to all of FIGS. 15 to 18, the EDI 70 is designed with a top plate 72, a top deflector plate 74 of truncated conical shape, and a lower generally cylindrical skirt 76. A gap 78 is positioned around the center column as shown, for eductor flow back into the EDI in a manner similar to that of FIG. 2. The EDI device 70 is somewhat similar to the larger EDI 55 of FIGS. 9 to 14 but may be smaller in diameter, i.e. diameter as compared to that of a clarifier and also in that it creates eductor flow and is enclosed at top. Several stages of baffle plates 60, e.g. four as shown in FIGS. 17 and 18, extend between the top plate 72 and a bottom plate 80. In the perspective view of FIG. 17 the top plate and deflector plate 72, 74 are omitted for clarity.

As in the faucet EDI described above, this EDI 70 has a series of annular discharge openings at bottom, indicated at 66 in the drawings. Again, the flow is radially outward from the influent column, including the eductor flow, through the baffle stages to an outer annular region of the EDI 70, as best seen in FIG. 16. The flow is then back radially inwardly, discharging the liquid through the annular discharge openings, which are progressively larger as the liquid moves toward center, thus balancing the distribution.

The faucet EDI 70 may be approximately the same size, relative to the clarifier, as the EDI 39 of FIG. 2. Because of the limited number of baffle plates 60 as compared to the embodiment shown in FIGS. 9 to 14, the flow of liquid is not so impeded as to prevent eductor flow at 78. This helps encourage the circular flow pattern in the clarifier, while achieving the even downward distribution of the faucet-style EDI as described above.

FIG. 18 shows the EDI 70 in top plan cross section as seen from just above a horizontal divider plate 82 seen in FIG. 16. Outward flow is indicated by arrows, to an outer region 84 where the liquid descends down toward the distribution outlets.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In a clarifier basin for settlement of solids in a wastewater treatment process, including an influent flow to the clarifier basin and an energy dissipating system for wastewater sludge flowing into the clarifier basin, the improvement comprising:

the influent flow pathway being positioned to discharge influent flow at a level below the liquid surface in the clarifier basin, the clarifier basin being without a feedwell, a reverse energy dissipating inlet (EDI) centrally located in the clarifier basin to receive the influent flow and comprising a bottom plate at a bottom side of the reverse EDI, and a top plate essentially covering an upper side of the reverse EDI, with the influent flow entering between the bottom and top plates, the reverse EDI being submerged in the liquid, and the reverse EDI further including a series of baffles positioned radially outwardly from the influent flow in a path of wastewater sludge flowing outward from the influent flow, the baffles effective, along with the structure of the top and bottom plates, to slow and dissipate flow velocity of the wastewater sludge, whereby the wastewater sludge is slowed and distributed into the clarifier basin without a feedwell.

2. The clarifier basin of claim 1, wherein the top plate includes a center portion and a conical deflector plate at a periphery of the top plate, the conical deflector plate extending outwardly and downwardly to generally direct sludge downwardly into the clarifier basin.

3. In a clarifier basin for settlement of solids in a wastewater treatment process, including an influent flow to the clarifier basin and an energy dissipating system for wastewater sludge flowing into the clarifier basin, the improvement comprising:

the influent flow pathway being positioned to discharge influent flow at a level below the liquid surface in the clarifier basin, a reverse energy dissipating inlet (EDI) centrally located in the clarifier basin to receive the influent flow and comprising a bottom plate and a top plate, with the influent flow entering between the bottom and top plates, the reverse EDI being submerged in the liquid, and the reverse EDI further including a series of baffles positioned radially outwardly from the influent flow in a path of wastewater sludge flowing outward from the influent flow, the baffles effective, along with the structure of the top and bottom plates, to slow and dissipate flow velocity of the wastewater sludge, whereby the wastewater sludge is slowed and distributed into the clarifier basin, the baffles including at least two concentric arrays of baffles, including an inner array of baffles closer to the influent flow and an outer array of baffles positioned outwardly from the inner array of baffles, the outer array of baffles being staggered in position relative to the inner array of baffles to establish a non-linear flow from the influent flow out into the clarifier basin without a feedwell.

4. In a clarifier basin for settlement of solids in a wastewater treatment process, including an influent flow to the clarifier basin and an energy dissipating system for wastewater sludge flowing into the clarifier basin, the improvement comprising:

the influent flow pathway being positioned to discharge influent flow at a level below the liquid surface in the clarifier basin, a reverse energy dissipating inlet (EDI) centrally located in the clarifier basin to receive the influent flow and comprising a bottom plate and a top plate, with the influent flow entering between the bottom and top plates, the reverse EDI being submerged in the liquid, and the reverse EDI further including a series of baffles positioned radially outwardly from the influent flow in a path of wastewater sludge flowing outward from the influent flow, the baffles effective, along with the structure of the top and bottom plates, to slow and dissipate flow velocity of the wastewater sludge, whereby the wastewater sludge is slowed and distributed into the clarifier basin, wherein the influent flow enters via a central influent pipe with pipe openings, and further including an eductor vent in the top plate, the eductor vent being located in a space adjacent to the central influent pipe, allowing clarifier basin liquid to enter the reverse EDI, the eductor vent being effective to allow flow from the clarifier basin to be drawn down into the reverse energy dissipating inlet, to join wastewater sludge exiting the pipe openings of the central influent pipe, to facilitate desired circulation of wastewater sludge within the clarifier basin without a feedwell.

5. In a clarifier basin for settlement of solids in a wastewater treatment process, including an influent flow to the clarifier basin and an energy dissipating system for wastewater sludge flowing into the clarifier basin, the improvement comprising:

the influent flow pathway being positioned to discharge influent flow at a level below the liquid surface in the clarifier basin, a reverse energy dissipating inlet (EDI) centrally located in the clarifier basin to receive the influent flow and comprising a bottom plate and a top plate, with the influent flow entering between the bottom and top plates, the reverse EDI being submerged in the liquid, and the reverse EDI further including a series of baffles positioned radially outwardly from the influent flow in a path of wastewater sludge flowing outward from the influent flow, the baffles effective, along with the structure of the top and bottom plates, to slow and dissipate flow velocity of the wastewater sludge, whereby the wastewater sludge is slowed and distributed into the clarifier basin without a feedwell, wherein the reverse EDI includes sludge discharge openings below the baffles for downward discharge, and including a divider floor below the baffles, so that the wastewater sludge flowing outwardly among the baffles is above the divider floor, which extends less than the full width of the reverse EDI to define a sludge flow path downwardly around outer edges of the divider floor at an outermost region of the reverse EDI, such that the wastewater sludge flows to the sludge discharge openings at a bottom of the reverse EDI and is discharged in a substantially uniform distribution downwardly into the clarifier basin.

6. The clarifier basin of claim 5, wherein the sludge discharge openings of the reverse EDI are sized and positioned such that the sludge discharge openings are progressively wider from upstream to downstream in the sludge flow path, to balance discharge distribution.

7. The clarifier basin of claim 6, wherein the sludge discharge openings comprise concentric annular openings.

8. The clarifier basin of claim 5, wherein the baffles are in staggered annular arrays, and including at least four annular arrays of baffles.

9. The clarifier basin of claim 5, wherein the divider floor has openings to cause a flow down through the divider floor in addition to the sludge flow path downwardly around outer edges of the divider floor.

10. The clarifier basin of claim 5, wherein the influent flow enters via a central influent pipe, the top plate of the reverse EDI having a central opening leaving an annular clearance between the top plate and the central influent pipe forming an eductor vent so that wastewater sludge circulates in a circulation pattern through the clarifier basin with some of circulating wastewater sludge drawn by eductor flow back into the reverse EDI, down along the central influent pipe.

11. In a clarifier basin for settlement of solids in a wastewater treatment process, including an influent flow to the clarifier basin and an energy dissipating system for wastewater sludge flowing into the clarifier basin, the improvement comprising:

the influent flow pathway being positioned to discharge influent flow at a level below the liquid surface in the clarifier basin, a reverse energy dissipating inlet (EDI) generally centrally located in the clarifier basin to receive the influent flow and including a bottom plate, with the influent flow entering above the bottom plate, and the reverse EDI further including series of baffles positioned radially outwardly from the influent flow in a path of wastewater sludge flowing outwardly from the influent flow, including at least two concentric arrays of said baffles with an inner array of baffles closer to the influent flow and an outer array of baffles positioned outwardly from the inner array of baffles, the outer array of baffles being staggered in position relative to the inner array of baffles to establish a non-linear flow from the influent flow out into the clarifier basin, the baffles being effective to slow and dissipate flow velocity of the wastewater sludge, whereby the wastewater sludge is slowed and distributed into the clarifier basin without a feedwell.

12. The clarifier basin of claim 11, wherein the reverse EDI includes sludge discharge openings below the baffles for downward discharge, and including a divider floor below the baffles, so that the wastewater sludge flowing outwardly among the baffles is above the divider floor, which extends less than the full width of the reverse EDI to define a sludge flow path downwardly around outer edges of the divider floor at an outermost region of the reverse EDI, such that the wastewater sludge flows to the sludge discharge openings at a bottom of the EDI and is discharged in a substantially uniform distribution downwardly into the clarifier basin.

13. The clarifier basin of claim 12, wherein the sludge discharge openings of the reverse EDI are sized and positioned such that the sludge discharge openings are progressively wider from upstream to downstream in the sludge flow path, to balance discharge distribution.

14. The clarifier basin of claim 13, wherein the sludge discharge openings comprise concentric annular openings.

15. The clarifier basin of claim 12, wherein the baffles are in staggered annular arrays, and including at least four annular arrays of baffles.

16. The clarifier basin of claim 12, wherein the divider floor has floor openings to cause a flow down through the divider floor in addition to the flow path downwardly around outer edges of the divider floor.

17. The clarifier basin of claim 12, wherein the reverse EDI has an upper end positioned substantially at the liquid level within the clarifier basin, the upper end of the reverse EDI being uncovered and open.

18. The clarifier basin of claim 12, wherein the reverse EDI is submerged in the liquid, and wherein the influent flow enters via a central influent pipe, the reverse EDI including a top plate as a cover of the reverse EDI, the top plate having a central opening leaving an annular clearance between the top plate and the central influent pipe forming an eductor vent so that wastewater sludge circulates in a pattern through the clarifier basin with some circulating sludge drawn by eductor flow back into the reverse EDI, down along the central influent pipe.

* * * * *